US006781986B1

(12) United States Patent
Sabaa et al.

(10) Patent No.: US 6,781,986 B1
(45) Date of Patent: Aug. 24, 2004

(54) SCALABLE HIGH CAPACITY SWITCH ARCHITECTURE METHOD, APPARATUS AND SYSTEM

(75) Inventors: Amr G. Sabaa, Nepean (CA); Ibrahim El-Etr, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/339,920

(22) Filed: Jun. 25, 1999

(51) Int. Cl.[7] .......................... H04L 12/28; H04L 12/56
(52) U.S. Cl. ...................................... 370/389; 370/422
(58) Field of Search ................................ 370/412, 413, 370/401, 414, 395.4, 395.1–395.3, 218, 369, 388, 398, 229–232, 422, 389; 710/52–56

(56) References Cited

U.S. PATENT DOCUMENTS

| | | | |
|---|---|---|---|
| 4,617,657 A | | 10/1986 | Drynan et al. ................. 370/60 |
| 5,241,536 A | * | 8/1993 | Grimble et al. ............ 370/60.1 |
| 5,245,616 A | | 9/1993 | Olson ........................... 371/32 |
| 5,425,025 A | | 6/1995 | Tahara .......................... 370/60 |
| 5,519,690 A | | 5/1996 | Suzuka et al. ................. 370/17 |
| 5,802,052 A | | 9/1998 | Venkataraman ............. 370/395 |
| 5,832,287 A | | 11/1998 | Atalla ......................... 395/800 |
| 5,892,894 A | | 4/1999 | Shiroshita et al. ..... 395/182.02 |
| 5,905,727 A | | 5/1999 | Christensen et al. ........ 370/395 |
| 5,923,662 A | | 7/1999 | Stirling et al. .............. 370/432 |

(List continued on next page.)

OTHER PUBLICATIONS

Amr Sabaa, Fayez Elguibaly, and Dale Shpak, Department of Electrical and Computer Engineering, University of Victoria, Victoria, B.C., "Performance Analysis of an Improved Selective Repeat Protocol for High–Speed Networks", Canadian Journal of Electrical and Computer Engineering, vol. 22, No. 1, 1997, pp. 29–36.

Amr Sabaa, Fayez ElGuibaly, and Dale Shpak, Department of Electrical and Computer Engineering, University of Victoria, Victoria, B.C., "Design and Modelling of a Nonblocking Input–Buffer ATM Switch", Canadian Journal of Electrical and Computer Engineering, vol. 22, No. 3, 1997, pp. 87–93.

Fayez ElGuibaly, Amr Sabaa, and Dale Shpak, Department of Electrical Engineering, University of Victoria, Victoria, B.C., "A New Shift–Register Based ATM Switch", Proc. The First Annual Conference on Emerging Technologies and Applications in Communications, Portland, Oregon, May 7–10, 1996, (3/96 IEEE) pp. 24–27.

A. Sabaa, H. El–Gebaly, F. El–Guibaly, J. Muzio, and D. Shpak, Department of Electrical Engineering, University of Victoria, Victoria, B.C., "Implementation of a Window–Based Scheduler in an ATM Switch", Proc. IEEE Canadian Conference Electrical and Computer Engineering, Montreal, Sep. 5–8, 1995, (9/95 IEEE) pp. 32–35.

(List continued on next page.)

Primary Examiner—Wellington Chin
Assistant Examiner—Raj Jain

(57) ABSTRACT

A method, apparatus and system for a scalable high capacity switch architecture involves a switching controller for use with a plurality of switching controllers in a switching system. Each switching controller has provisions for receiving a data packet, provisions for determining a destination of the data packet, provisions for determining whether any other switching controller in the system intends to transmit to the determined destination of the data packet and provisions for transmitting the received data packet to the determined destination when no other switching controllers intend to transmit to the determined destination.

27 Claims, 7 Drawing Sheets

U.S. PATENT DOCUMENTS

| | | | |
|---|---|---|---|
| 5,933,435 A | | 8/1999 | Shah et al. .................. 371/33 |
| 6,067,300 A | * | 5/2000 | Baumert et al. ............ 370/413 |
| 6,157,643 A | * | 12/2000 | Ma ............................. 370/389 |
| 6,188,686 B1 | * | 2/2001 | Smith ......................... 370/388 |
| 6,219,728 B1 | * | 4/2001 | Yin ............................. 710/52 |
| 6,480,492 B1 | * | 11/2002 | Lundback et al. ....... 370/395.1 |

OTHER PUBLICATIONS

H. El–Gebaly, A. Sabaa, J. Muzio, F. El–Guibaly, and D. Shpak, Department of Computer Science, University of Victoria, Victoria, B.C., "Performance Evaluation of a Window–Based Approach for ATM Cell Scheduling", Proc. IEEE Canadian Conference on Electrical and Computer Engineering, Montreal, Sep. 5–8, 1995, (9/95 IEEE) pp. 36–39.

A. Sabaa, F. El–Guibaly, E. Manning, and D. Shpak, Department of Electrical Engineering, University of Victoria, Victoria, B.C., "A New Protocol for Flow Control in ATM Networks", Proc. IEEE Pacific Rim Conference on Communications, Computers and Signals Processing, Victoria, May 17–19, 1995, (2/95 IEEE) pp. 96–99.

F. El–Guibaly, A. Almulhem, A. Sabaa, and D. Shpak, Department of Electrical Engineering, University of Victoria, Victoria, B.C., "A High–Speed CORDIC Algorithm", Proc. IEEE Pacific Rim Conference on Communications, Computers and Signals Processing, Victoria, May 17–19, 1995, (2/95 IEEE) pp. 485–488.

Amr Gaber Sabaa, "Switching and Error Recovery in Terabit ATM Networks", Ph.D. Thesis, pp. 1–133, 1998.

* cited by examiner

|     |                          | t1      | t2      | t3      |
| --- | ------------------------ | ------- | ------- | ------- |
|     | Label                    | (a)     | (b)     | (c)     |
|     | input schedule (60)      | 000     | 010     | 100     |
|     | Timeslot order           | 123     | 231     | 312     |
|     | destination order        | 123     | 123     | 123     |
| SW1 | Shifted Schedule (s) (62)| 000     | 100     | 001     |
|     | s'                       | 111     | 011     | 110     |
|     | Buffer (b)               | 010(2)  | 001(3)  | 001(3)  |
|     | s'b (now scheduled) (70) | 010 | 001 | 000 |
|     | s'b+s (output sched. (72))| 010    | 101     | 001     |
|     | Label                    | (d)     | (e)     | (f)     |
|     | input schedule (60)      | 000     | 010     | 101     |
|     | Timeslot order           | 123     | 231     | 312     |
|     | destination order        | 231     | 231     | 231     |
| SW2 | Shifted Schedule (s) (62)| 000     | 100     | 011     |
|     | s'                       | 111     | 011     | 100     |
|     | Buffer (b)               | 100(2)  | 100(2)  | 100(2)  |
|     | s'b (now scheduled) (70) | 100 | 000 | 100 |
|     | s'b+s (output sched. (72))| 100    | 100     | 111     |
|     | Label                    | (g)     | (h)     | (i)     |
|     | input schedule (60)      | 000     | 100     | 100     |
|     | Timeslot order           | 123     | 231     | 312     |
|     | destination order        | 312     | 312     | 312     |
| SW3 | Shifted Schedule (s) (62)| 000     | 001     | 001     |
|     | s'                       | 111     | 110     | 110     |
|     | Buffer (b)               | 010(1)  | 100(3)  | 001(2)  |
|     | s'b (now scheduled) (70) | 010 | 100 | 000 |
|     | s'b+s (output sched. (72))| 010    | 101     | 001     |

FIG. 4

PRIORITY TABLE

| D1 | D2 | D3 | DESTINATION ADDRESS | |
|----|----|----|----|----|
| 0 | 0 | 0 | 0 | 0 |
| 0 | 0 | 1 | 1 | 1 |
| 0 | 1 | 0 | 1 | 0 |
| 0 | 1 | 1 | 1 | 0 |
| 1 | 0 | 0 | 0 | 1 |
| 1 | 0 | 1 | 0 | 1 |
| 1 | 1 | 0 | 0 | 1 |
| 1 | 1 | 1 | 0 | 1 |

FIG. 11

| | $t_1$ | $t_2$ | $t_3$ |
|---|---|---|---|
| SW1 | D3 | D2 | - |
| SW2 | D2 | - | D2 |
| SW3 | - | D1 | - |

FIG. 12

SCALABLE HIGH CAPACITY SWITCH ARCHITECTURE METHOD, APPARATUS AND SYSTEM

BACKGROUND OF THE INVENTION

1. Field of the Invention

This invention relates to a method, apparatus and system for a scalable high capacity switch architecture and more particularly to one which employs distributed control.

2. Description of Related Art

A switch is a basic component of most telecommunications networks. Switches permit a large number of source devices to communicate with each of a large number of destination devices over a relatively smaller number of communications trunks. Information is sent over the communications trunks as discrete packets or cells of digital information, representing either data or voice transmissions, for example. Packet or cell transmission from a source device to a destination device must be maintained within narrow time parameters if an acceptable quality of service is to be maintained.

There are many different switch architectures. One architecture has a "shared memory" in which packets, each having a unique destination address corresponding to an output port, arrive from a plurality of input ports and are stored in a shared buffer located in a shared memory. A plurality of output ports has access to the shared memory and each output port is enabled to read packets addressed to it. A centralized controller controls read/write access to the memory to prevent contention between accessing devices. However, the scalability of the device is limited by the capacity of the centralized controller and the switching speed is limited by the memory access speed. Furthermore, the switch suffers from resiliency problems, as a failure of the centralized controller will disable the switch as a whole.

A similar architecture replaces the shared memory in the switch described above, with a space switch which establishes connections between individual input ports and output ports to permit transmission of a burst of packets, after which the connections are broken. Arbitration logic is provided to deal with contention that is, two or more input ports attempting to establish links with a single output port at the same time. The arbitration logic is linked to a centralized controller which controls the space switch and thereby controls access to the output ports. Like the shared memory architecture, this device suffers from resiliency and scalability problems due to the centralized nature of the controller. Furthermore, the control regime must be optimized to compromise between switching overhead and quality of service. If the burst length is too long, quality of service may be compromised as contending input ports are left unserved for unacceptably long time periods. If the burst length is too short, switching overhead increases to unacceptable levels.

With the increasing volume of packet traffic, it is desirable to increase the speed and capacity of switches to the range of terabits of information per second and beyond. In order to do this cost effectively, it is desirable to use a plurality of input devices in parallel, each having a capacity of 10 gigabits per second, for example. However, if a centralized controller is necessary to arbitrate contention between the plurality of input devices, the upper limit of the capacity of the switch is set by the centralized controller, and the scalability is limited. Instead, it would be desirable to distribute the control function among a plurality of switching controllers, each with its own bank of input ports, to facilitate scalability of input ports and switching capacity to increase switch throughput.

SUMMARY OF THE INVENTION

To address the above shortcomings, there is provided a scalable high capacity switch architecture which employs a distributed control regime to permit efficient use of bandwidth while preventing contention. A switch having this architecture has a plurality of input switching controllers, a plurality of output switching modules, and a cross bar switch located therebetween. Each switching controller determines whether any other switching controller in the switch intends to transmit to a particular destination at a particular time and if no other switching controller intends to transmit to such destination, the switching controller transmits to that destination. In this manner, bandwidth unused by other switching controllers can be used by one or more switching controller to transmit packets when they would not normally transmit such packets. Knowledge of intention to transmit is passed among the switching controllers to allow each switching controller to consider the intentions of the others to determine whether or not to transmit when others are not transmitting. Thus, it may be said that the system distributes control of when to transmit among all of the switching controllers.

In accordance with one aspect of the invention there is provided a method of operating a switching controller in a system comprised of a plurality of switching controllers. The method involves receiving a data packet at the switching controller and determining a destination of the data packet. The switching controller then determines whether any other switching controller in the system intends to transmit to the determined destination of the packet and transmits the received data packet to the determined destination at a time interval when no other switching controller intends to transmit to the determined destination.

In one embodiment, the switching controller receives an input schedule from another switching controller in the system specifying when other switching controllers in the system will not be transmitting to respective destinations.

In accordance with another aspect of the invention, there is provided a switching controller apparatus for use in a system comprised of a plurality of switching controllers. The apparatus includes a data packet receiver for receiving a data packet and a processor for determining the destination of the data packet. The processor also determines whether any other switch controller intends to transmit to the determined destination of the packet at a given time. The apparatus further includes a transmitter for transmitting the received data packet to the determined destination when no other switch controller intends to transmit to the determined destination.

In accordance with another aspect of the invention, there is provided a switching system including a plurality of switching modules, a crossbar switch in communication with the switching modules and a plurality of switching controllers in communication with the switching modules through the crossbar switch. The switching controllers are configured to communicate with each other to permit a data packet to be transmitted to its destination from a switching controller, at a time when the switching controller is not scheduled to transmit to the destination.

In accordance with another aspect of the invention there is provided a method of operating a plurality of switching controllers, the method comprising receiving data packets at respective switching controllers and transmitting the data packets from the switching controllers to their destinations according to a predefined schedule. The method also includes communicating among the switching controllers to permit a data packet to be transmitted from at least one switching controller to its destination at a time when that switching controller is not scheduled to transmit to that destination.

In accordance with another aspect of the invention, there is provided a switching controller apparatus for use in a system comprised of a plurality of switching controllers. The switching controller apparatus includes a unit for receiving a data packet, a unit for determining a destination of the data packet, a unit for determining whether any other switching controller in the system intends to transmit to the determined destination of the data packet and a unit for transmitting the received data packet to the determined destination when no other switching controllers intend to transmit to the determined destination.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 4 is a schematic representation of logical operations performed by respective switching controllers in scheduling time slots of the system shown in FIG. 1;

FIG. 11 is a truth table representing relationships between inputs and outputs of a priority table shown in FIG. 3; and FIG. 12 is a tabular representation of destinations to which packets are transmitted by switching controllers during respective transmission time slots of the system shown in FIG. 1, for a specific set of initial conditions and input conditions.

DETAILED DESCRIPTION

Figure 1:
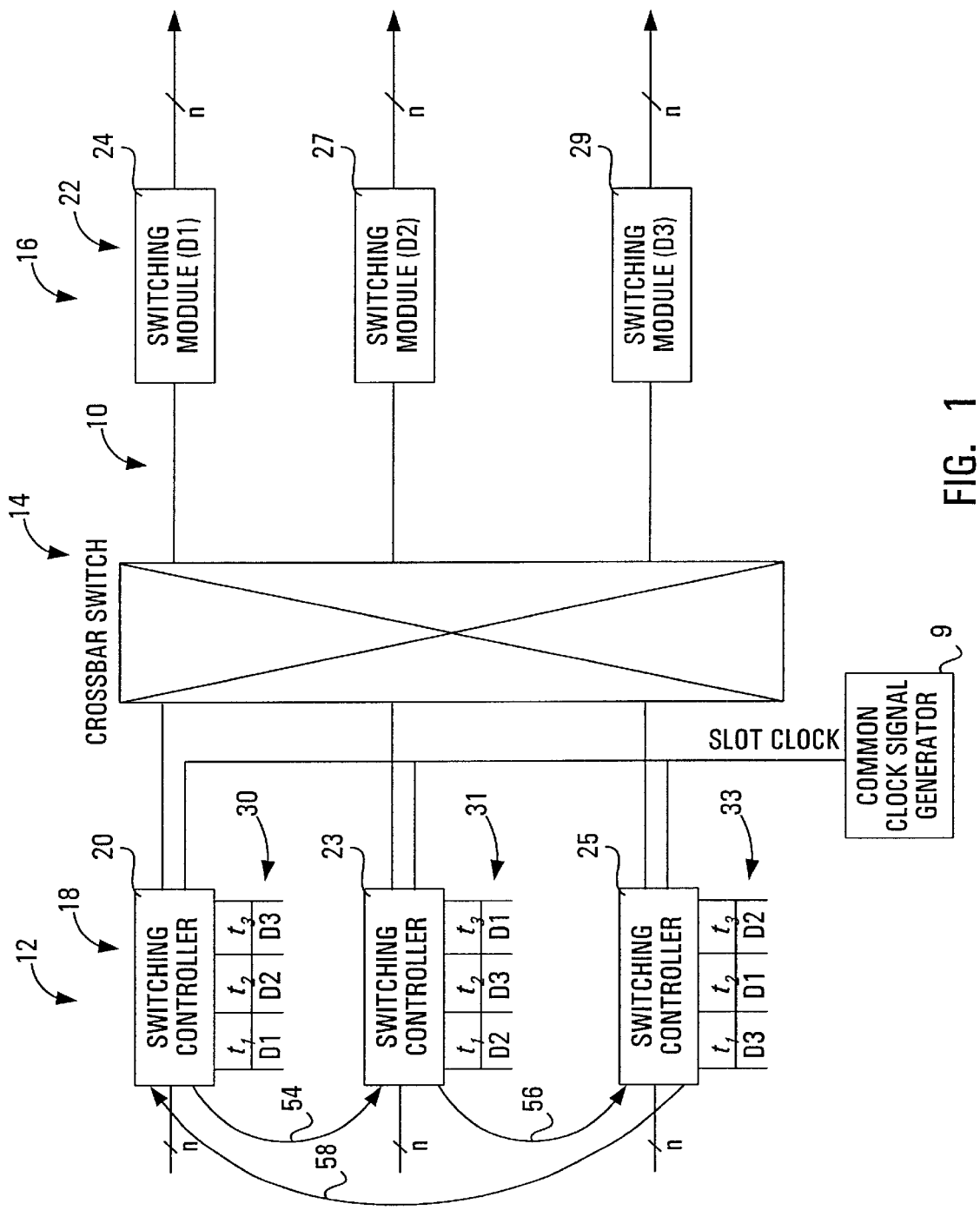
FIG. 1 is a schematic diagram of a switching system according to a first embodiment of the invention.

A scalable high capacity switch according to a first embodiment of the invention is shown generally at 10 in FIG. 1. The switch includes an input side 12, a cross bar switch 14 and an output side 16. The input side includes a plurality of switching controllers, shown generally at 18, including first, second and third switching controllers shown at 20, 23 and 25 respectively. Each of the switching controllers is respectively connected to the cross bar switch 14. In the general case, there may be N switching controllers.

The output side 16 includes a plurality of switching modules 22, including first, second and third modules 24, 27 and 29, respectively. Each switching module is also connected to the cross bar switch 14 to receive packets from the switching controllers 20, 23 and 25. In general the number of switching modules need not be same as the number of switching controllers.

The plurality of switching controllers 18 communicates with the cross bar switch 14 and the plurality of switching modules 22 to receive data packets or cells having respective destinations, and to direct such packets from respective input ports located on the switching controllers 20, 23 and 25 to output ports of the switching modules 24, 27 and 29.

Figure 2:
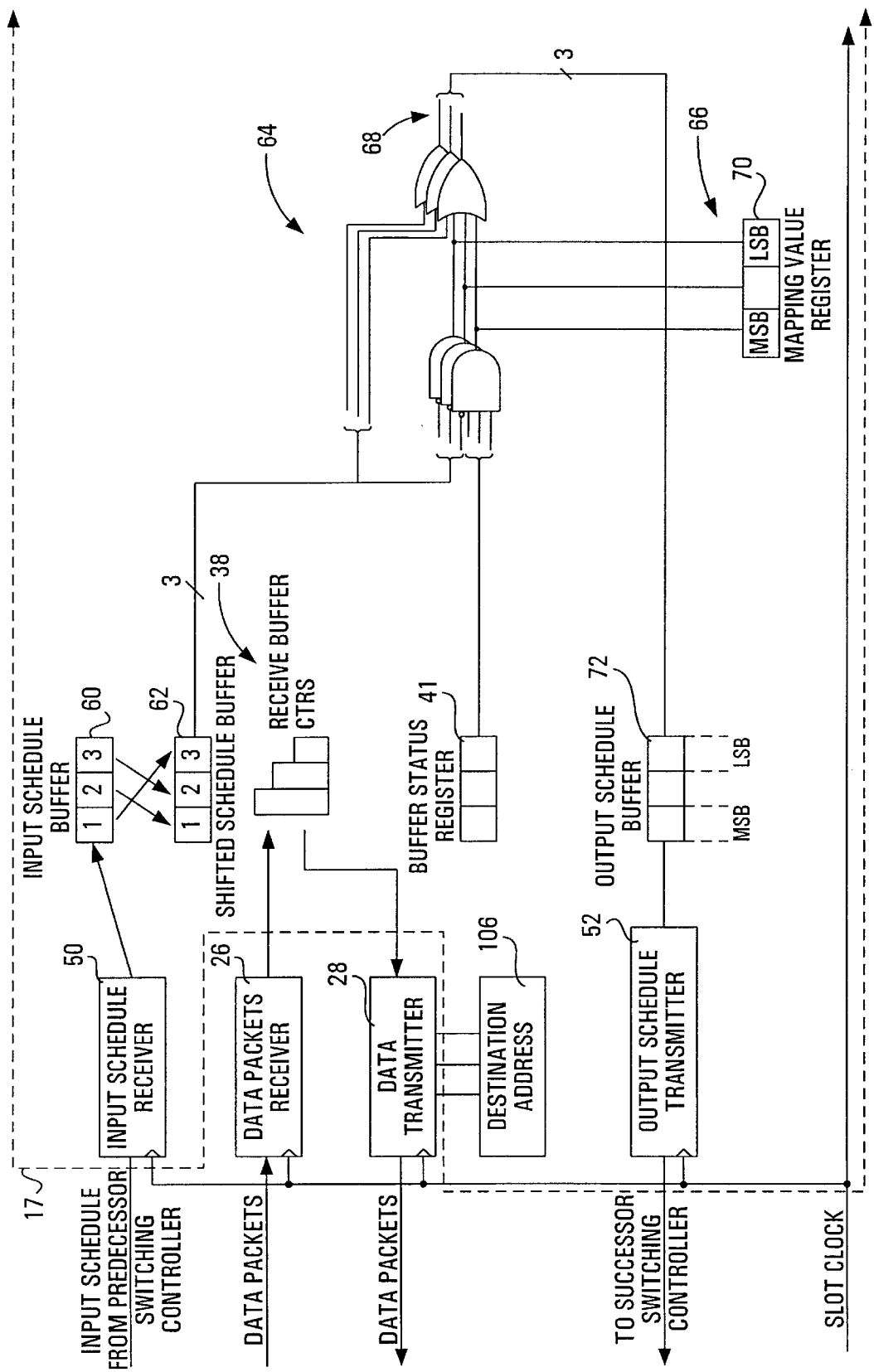
FIG. 2 is a block diagram and schematic representation of a first portion of a switching controller shown in FIG. 1.

Referring to FIG. 2, each switching controller includes a respective packet receiver 26 for receiving data packets having a destination address. In addition, each switching controller has a respective packet transmitter 28 for transmitting a received data packet to its destination, according to a predefined schedule unique to that switching controller.

The packet receiver 26 receives packets, determines their destinations and stores them in corresponding First In First Out (FIFO) buffers (not shown) associated with the destination. When a packet is stored in a given buffer, a buffer counter associated with such buffer is incremented. The respective buffer counters and their contents are shown generally at 38. In the general case, there are as many FIFO buffers and buffer counters as there are switching modules. In this embodiment, there are three.

The packet transmitter 28 is operable to receive a destination address from a destination address register 106 and from such destination address, determines which of the FIFO buffers to address in order to retrieve a packet for transmission to the corresponding switching module. When the packet transmitter 28 takes a packet from a FIFO buffer, the corresponding buffer counter 38 is decremented.

The status of the FIFO buffers is stored in a buffer status register 41 having respective registers 1, 2, 3 corresponding to respective FIFO buffers. If a FIFO buffer counter 38 has a non-zero, positive value, the corresponding register 1, 2, or 3 of the buffer status register 41 is loaded with a "1" and if the buffer counter 38 has a zero value, indicating that there are no packets in the corresponding FIFO buffer, the corresponding register of the buffer status register 41 is loaded with a "0". Thus, the buffer status register 41 indicates whether or not a corresponding FIFO buffer contains at least one packet ready for transmission.

Figure 3:
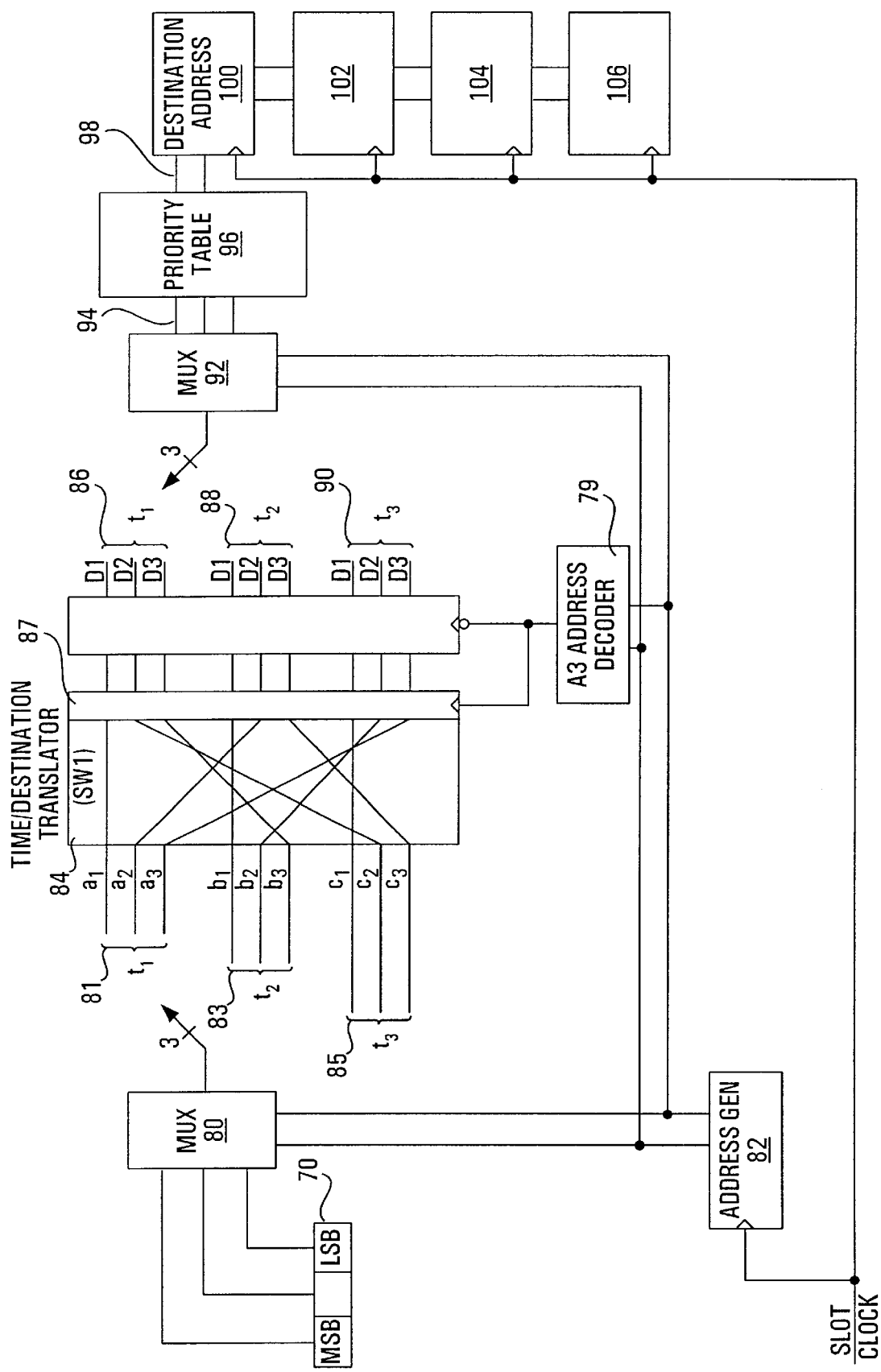
FIG. 3 is a schematic diagram of a second portion of the switching controller shown in FIG. 1.

The remainder of FIG. 2 and all of FIG. 3 illustrate a processor 17 for determining whether any other switching controller intends to transmit to the determined address of the received data packet and for directing the packet transmitter to transmit a received data packet to its destination when no other switching controller intends to transmit to the determined destination.

Referring back to FIG. 1, each switching controller is scheduled to transmit to selective destinations. Each switching controller is placed in communication with a corresponding destination switching module for a period of time which, in this embodiment, will be referred to as a time slot.

In this embodiment, the system includes a common clock signal generator 9 for producing a signal having a period defining the duration of time of one time slot. Each switching controller has a predefined schedule, shown generally at 30, 31 and 33, respectively listing time slots and corresponding destinations, i.e., switching modules, to which packets having such destinations are transmitted by respective switching controllers. Thus, for example, in the case of the first switching controller its predefined schedule specifies that during time slot $t_1$, packets destined for the first switching module 24 are transmitted, in time slot $t_2$ packets destined for the second switching module 27 are transmitted, and in time slot $t_3$ packets destined for the third switching module 29 are transmitted.

For ease of description, only three switching controllers and three switching modules 24 are shown, consequently each schedule 30 has only three time slots. In the general case, there may be N switching controllers in which case there would be N time slots. The time taken for a single switching controller such as the first switching controller 20 to send a packet to each of the switching modules 24, 27 and 29 is referred to as the switch cycle time. Thus in the general case, the switch cycle time includes N time slots.

The predefined schedules of respective switching controllers are staggered. Thus, for example, while the first switching controller 20 is scheduled to transmit to the first switching module 24 in a first time slot, the second switching controller 23 is scheduled to transmit to the second switching module 27 in the first time slot and the third switching controller 25 is scheduled to transmit to the third switching module 29 in the first time slot. In the second time slot, each switching controller is scheduled to transmit to the next successive switching module and so on until the next switching cycle where the schedule is repeated. Thus, each switching controller has a respective unique predefined schedule such that each switching controller is transmitting to a different switching module at each respective time slot and such that only one switching controller can transmit to a given switching module during a given time slot. In other words, the predefined schedules of the switching controllers 20, 23 and 25 are staggered, or shifted, one time slot to the left with respect to their predecessor switching controller's schedule.

While such predefined schedules prevent contention and avoid the need for centralized control, they may result in a large number of unused time slots and wasted bandwidth over the system as a whole as time slots corresponding to every switching module are assigned to switching controllers regardless of whether or not they have buffered packets for every switching module.

To more optimally use these time slots while maintaining distributed control of the switching controllers, in accordance with the invention the switching controllers 20, 23 and 25 are configured to communicate with each other to permit a data packet to be transmitted to a switching module from at least one switching controller at a time, in this embodiment, a predefined time slot, during which such switching controller is not scheduled to transmit to such destination. For example, if the first switching controller 20 has no packets destined for the first switching module 24 but does have packets destined for the second switching module 27, and the second switching controller 23 has no packets destined for the second switching module 27, the first switching controller 20 may use the first time slot $t_1$ to transmit to the second switching module 27, since no other switching controller is attempting to transmit to the second switching module 27 during this time slot. In this manner, time slots unused by other switching controllers can be used by a given switching controller to transmit to a switching module in a time slot ahead of the pre-scheduled time slot in which transmissions to such switching module are pre-scheduled to occur. In this manner, the packet transmission efficiency of the switch controller is increased and hence the packet transmission efficiency of the overall switch 10 is also increased.

Referring back to FIG. 2, to facilitate distributed control among switching controllers to permit a given switching controller to send packets to a switching module outside of its predefined schedule, each switching controller includes an input schedule receiver 50 for receiving an input schedule associating available destinations with available timslots, from a predecessor switching controller. In addition, each switching controller includes an output schedule transmitter 52 for transmitting an output schedule associating available destinations and timeslots for use by other switching controllers to a successor switching controller. Thus, referring back to FIG. 1, in the embodiment shown, the first switching controller 20 transmits an output schedule to the second switching controller 23 as shown by arrow 54. Similarly, the second switching controller 23 transmits an output schedule to the third switching controller 25 as shown generally by arrow 56. Similarly, the third switching controller 25 transmits an output schedule to the first switching controller 20 as shown generally at 58. Thus, the switching controllers communicate with each other.

Referring back to FIG. 2, the input schedule receiver 50 receives the input schedule from its predecessor switching controller and stores such schedule in an input schedule buffer 60. In this embodiment, the input schedule includes a three bit word having respective bits which are stored in respective first, second and third registers (1, 2 and 3) of the input schedule buffer 60. In the general case, the input schedule includes an N bit word and the input schedule buffer has N registers.

Because the predefined schedules of respective switching controllers are staggered, the input schedule received from the predecessor switching controller represents destinations to which packets are to be transmitted and the order of such destinations is relative to the predecessor switching controller. Consequently, the input schedule must be shifted to align respective destinations of the input schedule with time slots of the receiving switching controller. This is accomplished by shifting the contents of the input schedule buffer one position to the left.

Thus, in this embodiment, the bit in the second register is stored in a first register of a shifted schedule buffer 62. Similarly, the bits stored in the third and first registers of the input schedule buffer 60 are stored in second and third registers, respectively of the shifted schedule buffer 62.

The contents of the shifted schedule buffer 62 represent receiving and non-receiving destinations from the perspective of the receiving switching controller. In this example, a "1" in a given register indicates that the corresponding destination will receive a packet from another device and a "0" indicates that no other device intends to send to the associated destination.

With the information contained in the shifted schedule buffer 62 and the buffer status register 41, a logic circuit shown generally at 64 is used to generate time slot/destination mapping values at a first plurality of outputs shown generally at 66 and to generate an output schedule at a second plurality of outputs 68. The time slot/destination mapping values are stored in a mapping value register 70, while the output schedule is stored in an output schedule buffer 72.

The output schedule associates available destinations with available timeslots for use by other switching controllers in response to the received input schedule and the representations of the FIFO buffer status as provided by the buffer status register 41. The contents of the output schedule buffer 72 are provided to the output schedule transmitter 52 which transmits the output schedule to the successor switching controller.

Referring to FIG. 3, the contents of the mapping value register 70 are applied to a first multiplexer 80 controlled by an address generator 82 incremented by the slot clock signal. Thus, a different address is presented to the multiplexer 80, by the address generator 82, during each time slot. Effectively, the mapping value represents destinations to which data packets are to be transmitted in response to the input schedule and determined destinations of data packets received, as indicated by the buffer status register 41.

The effect of the address generator 82 on the multiplexer 80 is to direct the contents of the mapping value register to one of three input triplets 81, 83 and 85 of a time/destination translator 84 which, in this embodiment, is implemented by a fusible link device. The time/destination translator 84 has nine outputs which are controlled by respective inputs according to an internal fuse pattern. The outputs are set asynchronously and held set, until completion of the switching cycle by a 9 bit wide SR flip-flop 87. The outputs of the SR flip-flop are connected to a 9 bit wide D flip-flop 89 which is loaded during the $t_3$ time slot in response to a signal produced by an address decoder 79 acting in response to the $t_3$ address set by the address generator 82.

The outputs of the D flip-flop are grouped as three triplets 86, 88 and 90 and are held active for the following switching cycle during which the address generator 82 presents successive addresses to both the first and second multiplexers 80 and 92. The addresses applied to the second multiplexer 92 direct that multiplexer 92 to connect one of the output triplets 86, 88, 90 to an input 94 of a priority table 96 which produces a destination address at an output 98 thereof.

The destination address is stored in a first destination address register 100 and is shifted to three successive destination address registers 102, 104 and 106, successively on subsequent slot clock cycles. A full switching cycle time occurs before the destination address is received in a final destination address register 106. Effectively, destination address registers 100–106 act as a shift register for shifting the destination address three times, (or N times in the general case) so that destination addresses produced during the time slots of one switching cycle are received in the final destination address register 106 in corresponding time slots of the immediately following switching cycle. Thus, at least one destination address is produced during each timeslot, in response to mapping values produced during one switching cycle of the switching controller.

Each time a new address is stored in the destination address register 106, the data packet transmitter 28 shown in FIG. 2 retrieves a packet from the addressed FIFO buffer and transmits it to the associated destination. Thus the destination address identifies to the data packet transmitter a destination to which a data packet is to be transmitted. As this occurs, a new input schedule is received in the input schedule receiver 50 and a new mapping value is stored in the mapping value register 70 and applied to the circuit shown in FIG. 3 to produce another destination address, and so on.

The process of producing a new destination address in response to an input schedule and the packet buffer status register during a given time slot is herein referred to as a scheduling operation.

Operation

Referring to FIGS. 2 and 4, logic operations performed by the circuit shown in FIG. 2, at each switching controller shown in FIG. 1, during successive scheduling operations are shown generally at 120 in FIG. 4. Such operations are shown associated with a corresponding switching controller, identified as SW1, SW2 and SW3 respectively on the left hand side of the drawing and time slots identified as $t_1$, $t_2$ and $t_3$ across the top of the drawing. Thus, the first switching controller SW1 has first, second and third logic operations labelled as (a), (b) and (c) which occur during time slots $t_1$, $t_2$ and $t_3$, respectively.

The entries labelled "Time Slot Order" and "Destination Order" are for reference only and have decimal values representing time slots and destinations respectively for ease in associating the bits of each entry with destinations and time slots. Note that during the first time slot, the time slots and destinations are associated as per the original schedules 30, 31 and 33 shown in FIG. 1, for each switching controller 20, 23, 25 respectively. In the second time slot, the time slots and destinations are aligned with time slots shifted one unit to the left and in the third time slot, the time slots and destinations are aligned with time slots shifted two units to the left, and so on. In general, the destinations and associated time slots are thus considered from the perspective of the M predecessor where M is the (number of the time slot minus $1)_{MOD\ N}$, where N is the number of time slots.

Inputs to respective scheduling operations are provided by the entries labelled "input schedule" and "Buffer (b)". The input schedule is the contents of the input schedule buffer 60 and the buffer is the contents of the buffer status register 41. The numbers in brackets beside the bits representing the contents of the buffer status register indicate the switching modules or destinations to which packets are ready to be sent.

The entries labelled "Shifted Schedule (s)" represent the contents of the shifted schedule buffer 62, and the entries labelled "s'" represent the complement of the contents of the shifted schedule buffer 62.

The entries labelled "s'b (now scheduled)" represent a modified schedule identifying destinations which are to receive packets as a result of free and used destinations identified by the input schedule, and the current requirements of the switching controller as identified by the buffer value. The values associated with the s'b (now scheduled) entries are calculated as the logical "AND" of the complement of bits in the shifted schedule buffer 62 and corresponding bits in the buffer status register 41. These entries are bold to identify them as those used in the circuit shown in FIG. 3.

The entries labelled "s'b+s (output schedule)" represent the output schedule which is stored in the output schedule buffer 72 to be transmitted to the next successive switching controller. The values associated with these entries are calculated as the logical "OR" of the bits of the s'b values with corresponding bits of the contents of the s' value. The curved arrows, one of which is labelled 130, show communication of the output schedules to successor switching modules for use in successive time slots.

In FIG. 4, a "0" in a bit position of the s'b+s output schedule value indicates no desire to send a packet from the associated switching controller to the destination switching module indicated in the corresponding column of the order row associated with the same switching controller. Conversely, a "1" represents a desire to transmit to the associated destination switching module. Thus, available time slot information is passed from one switching controller to the next.

One effect of the logical operations is to adjust the input schedule to reflect the requirements of the instant switching controller and to pass an updated output schedule to a successor switching controller. This process of passing output schedules and updating them at the receiving switching controller continues until each switching controller has considered each other switching controller's schedule. Thus, in effect information relating to available time slots, taking into account the requirements of all switching controllers, is passed among the switching controllers to allow them to determine which time slots are available for use outside of their predefined schedules.

Referring to FIGS. 2 and 4, during each scheduling operation, the mapping value register 70 is loaded with values representing destinations to which packets are to be sent. These values are indicated in bold in FIG. 4. In addition, because the order of the bits is associated with respective time slots as indicated by the time slot row, this representation also represents desired time slots in which packets are to be transmitted to desired destinations. The relationship between time and destination is extracted through the use of circuits shown in FIG. 3 in which the contents of the mapping value register 70 are received at the multiplexer 80 and forwarded to corresponding inputs of a respective addressed input triplet 81, 83 and 85 of the time/destination translator 84.

Figure 5:
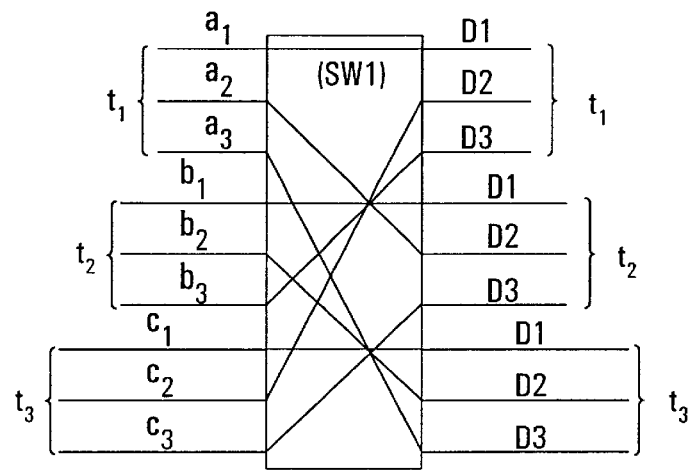
FIG. 5 is a schematic diagram of a time/destination translator associated with a first switching controller shown in FIG. 1.
Figure 6:
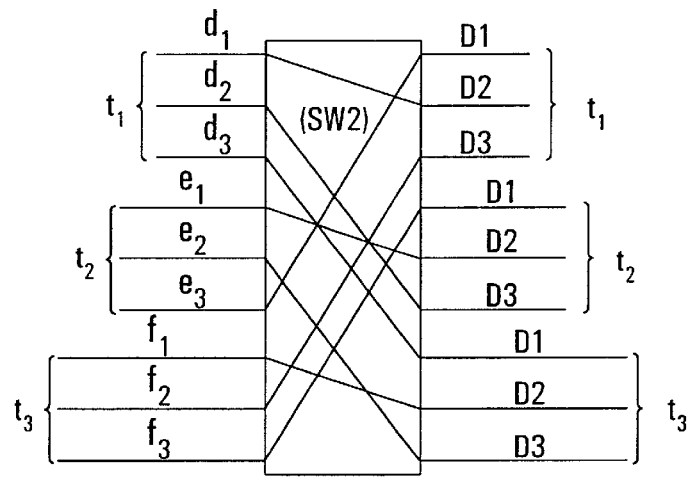
FIG. 6 is a schematic diagram of a time/destination translator of a second switching controller shown in FIG. 1.
Figure 7:
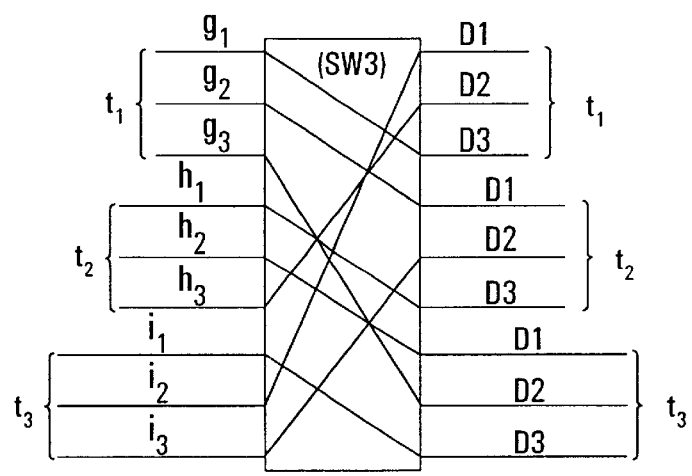
FIG. 7 is a time/destination translator associated with a third switching controller shown in FIG. 1.

Effectively, the time/destination translator maps destinations provided by the contents of the mapping value register 70 received at the addressed triplet to output triplets 86, 88 or 90 according to the relationship between the contents of the destination order row and the time slot order row of the corresponding scheduling operation shown in FIG. 4. Thus for example, the first switching controller has a time/destination translator as shown in FIG. 5, the second switching controller has a time/destination translator as shown in FIG. 6 and the third switching controller has a time/destination translator as shown in FIG. 7.

Figures 8, 9, 10:
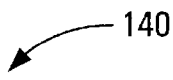
FIG. 8 is a tabular representation of a mapping of time/destination translator inputs to time/destination translator outputs for the first switching controller shown in FIG. 1.
FIG. 9 is a tabular representation of a mapping of time/destination translator inputs to time/destination translator outputs for the second switching controller shown in FIG. 1.
FIG. 10 is a tabular representation of a mapping of time/destination translator inputs to time/destination translator outputs for the third switching controller shown in FIG. 1.

The specific links in the time/destination translator are determined by the desired predefined schedule of the switching controller which specifically requires that the first scheduling operation (a) for example, in the case of the first switching controller, specifies transmitting to destinations according to the predefined schedule of the switching controller. Thus, in the case of the first switching controller, bit $a_1$ represents transmitting to the first switching module 24 during the first time slot (hence $a_1$ is associated with $t_1$ and $D_1$ in FIG. 8), bit $a_2$ represents transmitting to the second switching module 27 during the second time slot (hence $a_2$ is associated with $t_2$ and $D_2$) and bit $a_3$ represents transmitting to the third switching module 29 during the third time slot (hence $a_3$ is associated with $t_3$ and $D_3$). Using this information, a map as shown in FIG. 8 is derived and from such map, the links to be burned into the time/destination translator are readily determined. Thus effectively the time/destination translator defines the predefined schedule of the switching controller in which it resides.

At the first switching controller 20, the time/destination translator 84 and the SR flip-flop 87 produce values representing all three scheduling operations, which are transferred to the D flip-flop at the end of the switching cycle. These values are shown in tabular form at 140 in FIG. 8, for the first switching controller 20, in FIG. 9 for the second switching controller 23 and in FIG. 10 for the third switching controller 25 which show the mapping of respective time/destination translator inputs to time/destination translator outputs for each switching controller. Referring to FIG. 8, for example, during time slot $t_1$, when the second multiplexer 92 addresses the first output triplet 86, bit values originally defined by the first bit in the s'b entry produced in scheduling operation (a), the second bit in the s'b entry produced in scheduling operation (c) and the third bit in the s'b entry produced in scheduling operation (b) are presented to the priority table. In the example shown, in time slot $t_1$, the priority table 96 of the first switching controller thus receives the value "001" indicating that at time $t_1$ the first switching controller desires to transmit to the third switching module (D3). It will be appreciated that the values produced by the time/destination translator may express a desire to transmit to more than one destination during a given time slot. The priority table resolves this.

In this embodiment, the priority table produces outputs according to the truth table shown in FIG. 11 to provide a single destination address at its output 98. In this embodiment, when presented with the value "001" it can be seen that the priority table produces the destination address "11", representing the third switching module 29 (destination $D_3$).

In this embodiment the priority table provides priority to destination 1 where it can be seen that whenever input D1 is active, the destination address is set to 01. Thus, depending upon the destination values received at the input to the priority table, a corresponding destination address is provided and stored in the first destination address register 100.

It will be appreciated that other priority tables may be used and that priority tables may be changed dynamically to provide a varying priority, for example. Alternatively, the priority table need not provide any priority at all but may merely specify a mapping of input values to destination addresses. Furthermore, because one or more inputs $D_1$, $D_2$, $D_3$ may be active, an alternative mapping may provide more than one destination address to one or more data packet transmitters which may allow more than one packet to be transmitted in a time slot, depending upon the bandwidth of the overall system.

Following the operations described above, during each time slot new destination values $D_1$, $D_2$ and $D_3$ are applied to the priority table and a new destination address is produced and shifted toward the final destination address register 106. The contents of register 106 are applied to the packet transmitter 28 shown in FIG. 2 as a destination address which informs the packet transmitter 28 of the FIFO buffer from which a packet is to be retrieved and then transmitted. The packet transmitter 28 thus retrieves the packet from the indicated FIFO buffer and transmits it to the corresponding switching module shown in FIG. 1.

Referring to FIG. 12, in the embodiment shown, each switching controller transmits during time slots $t_1$, $t_2$ and $t_3$ to the destination switching modules indicated by the contents of the final destination address register 106 at respective times. Using the example values provided in FIG. 4, during $t_1$, the first switching controller 20 transmits to the third switching module 29 (D3), during $t_2$ it transmits to the second switching module 27 (D2) and in time $t_3$, it does not transmit.

Similarly, during time $t_1$, the second switching controller 23 transmits to the second switching module 27 (D2), during time $t_2$ it does not transmit and during time $t_3$, it transmits to the third switching module 29 (D3).

Similarly, during times $t_1$ and $t_3$, the third switching controller 25 does not transmit and during time $t_2$, it transmits to the first switching module 24.

It can be seen, that whereas according to the pre-allocated schedule 30 shown in FIG. 1, during time $t_1$ the first switching controller 20 would be transmitting to the first switching module 24 (D1), because the first switching controller 20 had received no packets destined for the first switching module 24, and as no other switching controller intended to transmit to the third switching module 29, the schedule of the first switching controller 20 was reconfigured to cause it to transmit to the third switching module 29 outside of its predefined schedule. Similarly, during time $t_3$, the second switching controller 23 would have transmitted to the first switching module 24 according to its predefined schedule 31, however, in the example shown, the second switching controller 23 transmits to the second switching module 27 during time slot $t_3$, which is outside of its predefined schedule. In other words, a predefined schedule associating destinations with time slots is adjusted to cause a data packet to be transmitted to its destination in a time slot not previously in the predefined schedule.

While specific embodiments of the invention have been described and illustrated, such embodiments should be construed as illustrative only and not as limiting the invention as construed in accordance with the accompanying claims.

What is claimed is:

1. A method of operating a switching controller in a system comprised of a plurality of switching controllers, the method comprising:

a) receiving from a predecessor switching controller an input schedule associating available destinations with available timeslots;

b) receiving data packets;

c) determining respective destinations of said data packets;

d) determining, from said input schedule, whether any other switching controller in said system intends to transmit to any of the determined destinations of the data packets in a timeslot identified by a pre-defined transmit schedule associated with said any other switching controller;

e) adjusting a pre-defined transmit schedule associated with said switching controller by producing a mapping value representing destinations to which said received data packets are to be transmitted, in response to the input schedule and determined destinations of received data packets;

f) transmitting received data packets according to said mapping value such that at least some of said received data packets are transmitted to their destinations during available time slots identified by said input schedule as being unused by said any other switching controller in said system.

2. A switching controller apparatus in a system comprised of a plurality of switching controllers, the apparatus comprising:

a) an input schedule receiver operable to receive from a predecessor switching controller an input schedule associating available destinations with available timeslots;

b) a data packet receiver operable to receive data packets and operable to determine respective destinations of said data packets;

c) a processor configured to:
        i) determine, from said input schedule, whether any other switching controller in said system intends to transmit to any of the determined destinations of the data packets in a timeslot identified by a pre-defined transmit schedule associated with said any other switching controller; and
        ii) adjust a pre-defined transmit schedule associated with said switching controller by producing a mapping value representing destinations to which said received data packets are to be transmitted, in response to the input schedule and determined destinations of received data packets;

d) a data packet transmitter configured to transmit received data packets according to said mapping value such that at least some of said received data packets are transmitted to their destinations during available time slots identified by said input schedule as being unused by said any other switching controller in said system.

3. A method of operating a switching controller in a system comprised of a plurality of switching controllers, the method comprising:

a) receiving from a predecessor switching controller an input schedule associating available destinations with available timeslots;

b) receiving data packets;

c) determining respective destinations of said data packets;

d) storing said data packets in buffers associated with their respective destinations, each of said buffers having a buffer fill status indicator;

e) determining from said input schedule whether other switching controllers in said system intend to transmit to any of said respective destinations according to a pre-determined schedule associated with respective said other switching controllers;

f) causing at least one said data packet to be transmitted to its respective destination during a timeslot identified by said input schedule as being unused by said other switching controllers; and g) producing an output schedule associating available destinations with available timeslots and dependent upon said input schedule and said buffer fill status indicators and being operable to be used as an input schedule by a successor switching controller in said system.

4. A switching controller apparatus in a system comprised of a plurality of switching controllers, the apparatus comprising:

a) an input schedule receiver configured to receive from a predecessor switching controller an input schedule associating available destinations with available timeslots;

b) a data packet receiver configured to receive data packets;

c) a processor configured to determine respective destinations of said data packets;

d) buffers configured to store said data packets according to their respective destinations, each of said buffers having a buffer fill status indicator;

e) a processor configured to determine from said input schedule whether other switching controllers in said system intend to transmit to any of said respective destinations according to pre-determined schedules associated with respective said other switching controllers;

f) a processor configured to cause at least one data packet to be transmitted to its respective destination during a timeslot identified by said input schedule as being unused by said other switching controllers in said system; and g) a processor configured to produce an output schedule associating available destinations with available timeslots and dependent upon said input schedule and said buffer fill status indicators and being operable to be used as an input schedule by a successor switching controller in said system.

5. A switching controller apparatus in a system comprised of a plurality of switching controllers, the apparatus comprising:

a) means for receiving from a predecessor switching controller an input schedule associating available destinations with available timeslots;

b) means for receiving data packets;

c) means for determining respective destinations of said data packets;

d) means for storing said data packets in buffers associated with their respective destinations, each of said buffers having a buffer fill status indicator;

e) means for determining from said input schedule whether other switching controllers in said system intend to transmit to any of said respective destinations according to a pre-determined schedule associated with respective said other switching controllers;

f) means for causing at least one data packet to be transmitted to its respective destination during a timeslot identified by said input schedule as being unused by said other switching controllers; and g) means for producing an output schedule associating available destinations with available timeslots and dependent upon said input schedule and said buffer fill status indicators and being operable to be used as an input schedule by a successor switching controller in said system.

6. The method claimed in claim 1 further comprising producing a mapping value during each timeslot.

7. The method claimed in claim 1 further comprising producing at least one destination address in response to mapping values produced during one switching cycle of said switching controller, said destination address identifying to a data packet transmitter a destination to which a data packet is to be transmitted.

8. An apparatus for associating information with an object in a file, the apparatus comprising a scheduler including a component for associating a search key with the object in the file, wherein said scheduler is operable to schedule a search for said information using said search key for automatic future execution by a search interface operable to initiate scheduled searches.

9. The apparatus claimed in claim 8 wherein said scheduler is operable to tag the object.

10. The method claimed in claim 1 further comprising producing an output schedule associating available destinations with available timeslots for use by other switching controllers.

11. The method claimed in claim 1 further comprising storing received data packets in respective buffers associated with destinations of said data packets.

12. The method claimed in claim 11 further comprising producing a representation of buffer status representing whether or not said buffers have one or more data packets ready for transmission.

13. The method claimed in claim 12 further comprising producing an output schedule associating available destinations with available timeslots for use by other switching controllers, in response to said input schedule and said representation of buffer status.

14. The method claimed in claim 13 further comprising transmitting said output schedule to a successor switching controller in said system.

15. The method claimed in claim 1 further comprising producing an output schedule associating available destinations with available timeslots, said output schedule defining presently available destinations and timeslots.

16. The method claimed in claim 15 further comprising transmitting said output schedule to a successor switching controller in said system.

17. The apparatus claimed in claim 2 wherein said processor produces a mapping value during each timeslot.

18. The apparatus as claimed in claim 17 wherein said processor produces at least one destination address in response to mapping values produced during one switching cycle of said switching controller, said destination address identifying to said data packet transmitter a destination to which a data packet is to be transmitted.

19. The apparatus as claimed in claim 18 wherein said processor produces at least one new destination address during each timeslot.

20. The apparatus as claimed in claim 19 wherein said processor directs said transmitter to transmit at least one data packet to its corresponding destination each time a new destination address is produced.

21. The apparatus as claimed in claim 2 wherein said processor produces an output schedule associating available destinations with available timeslots for use by other switching controllers.

22. The apparatus as claimed in claim 2 further including buffers loadable by said data packet receiver and in communication with said processor for storing received data packets, said buffers being associated with respective destinations of said data packets.

23. The apparatus as claimed in claim 22 further comprising a buffer status register in communication with said buffers and said processor for storing a representation of buffer status representing whether or not said buffers have one or more data packets ready for transmission.

24. The apparatus as claimed in claim 23 wherein said processor produces an output schedule associating available destinations with available timeslots for use by other switching controllers, in response to said input schedule and said representation of buffer status.

25. The apparatus as claimed in claim 24 further comprising an output schedule transmitter for transmitting said output schedule to a successor switching controller in said system.

26. The apparatus as claimed in claim 2 wherein said processor produces an output schedule associating available destinations with available timeslots, said output schedule defining presently available destinations and timeslots.

27. The apparatus as claimed in claim 26 further comprising a transmitter for transmitting said output schedule to a successor switching controller in said system.

\* \* \* \* \*